(12) United States Patent
Blyden et al.

(10) Patent No.: US 6,217,958 B1
(45) Date of Patent: Apr. 17, 2001

(54) ORNAMENTAL DEVICE FOR HOOD OF A CAR

(76) Inventors: Ira Blyden; Van Blyden, both of 457 E. 184th St., Bronx, NY (US) 10458

( * ) Notice: Subject to any disclaimer, the term of this patent is extended or adjusted under 35 U.S.C. 154(b) by 0 days.

(21) Appl. No.: 09/249,683

(22) Filed: Feb. 13, 1999

Related U.S. Application Data

(63) Continuation-in-part of application No. 08/872,947, filed on Jun. 11, 1997, now abandoned.

(51) Int. Cl.[7] .................................................. B60R 13/00
(52) U.S. Cl. .............................. 428/31; 428/99; 428/323; 428/425.9; 428/900; 40/591; 40/600; 40/621; 40/638
(58) Field of Search .................................. 428/31, 99, 323, 428/425.9, 522, 900; 40/600, 638, 616, 591, 621; 156/249, 60, 267, 299

(56) References Cited

U.S. PATENT DOCUMENTS

| | | | | |
|---|---|---|---|---|
| 3,826,026 | * | 7/1974 | Bevan | 40/10 B |
| 4,663,874 | * | 5/1987 | Sano et al. | 40/621 |
| 5,503,891 | * | 4/1996 | Marshall et al. | 428/99 |

* cited by examiner

Primary Examiner—Deborah Jones
Assistant Examiner—Abraham Bahta
(74) Attorney, Agent, or Firm—Richard B. Klar, Esq.

(57) ABSTRACT

A decorative ornament for a hood of an automobile includes a weather resistant first layer and a second layer adhesively bonded to said first weather resistant layer. The first weather resistant layer may have a design printed or placed on by other technique including by ink or photography. The second layer has magnetic properties which connects the second layer flatly and firmly to the hood of the car to decorate the car.

18 Claims, 4 Drawing Sheets

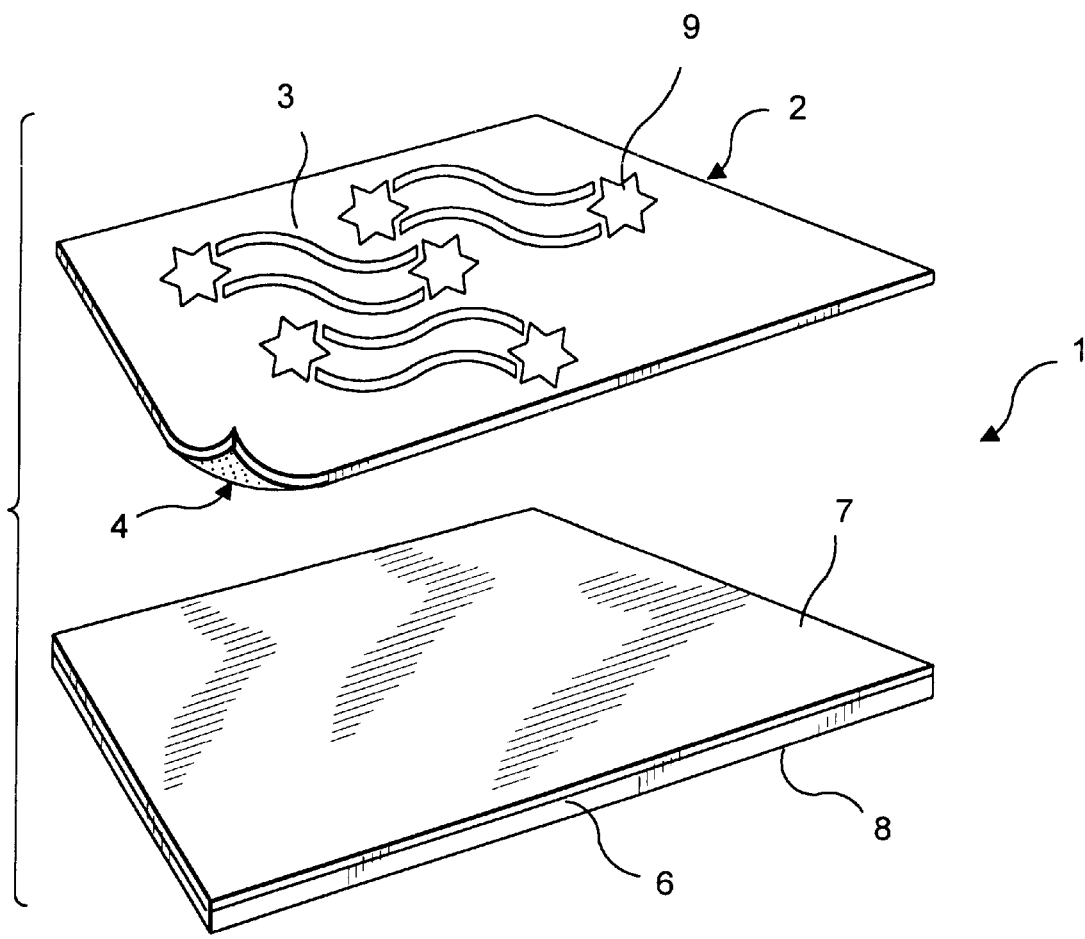
F I G. 1

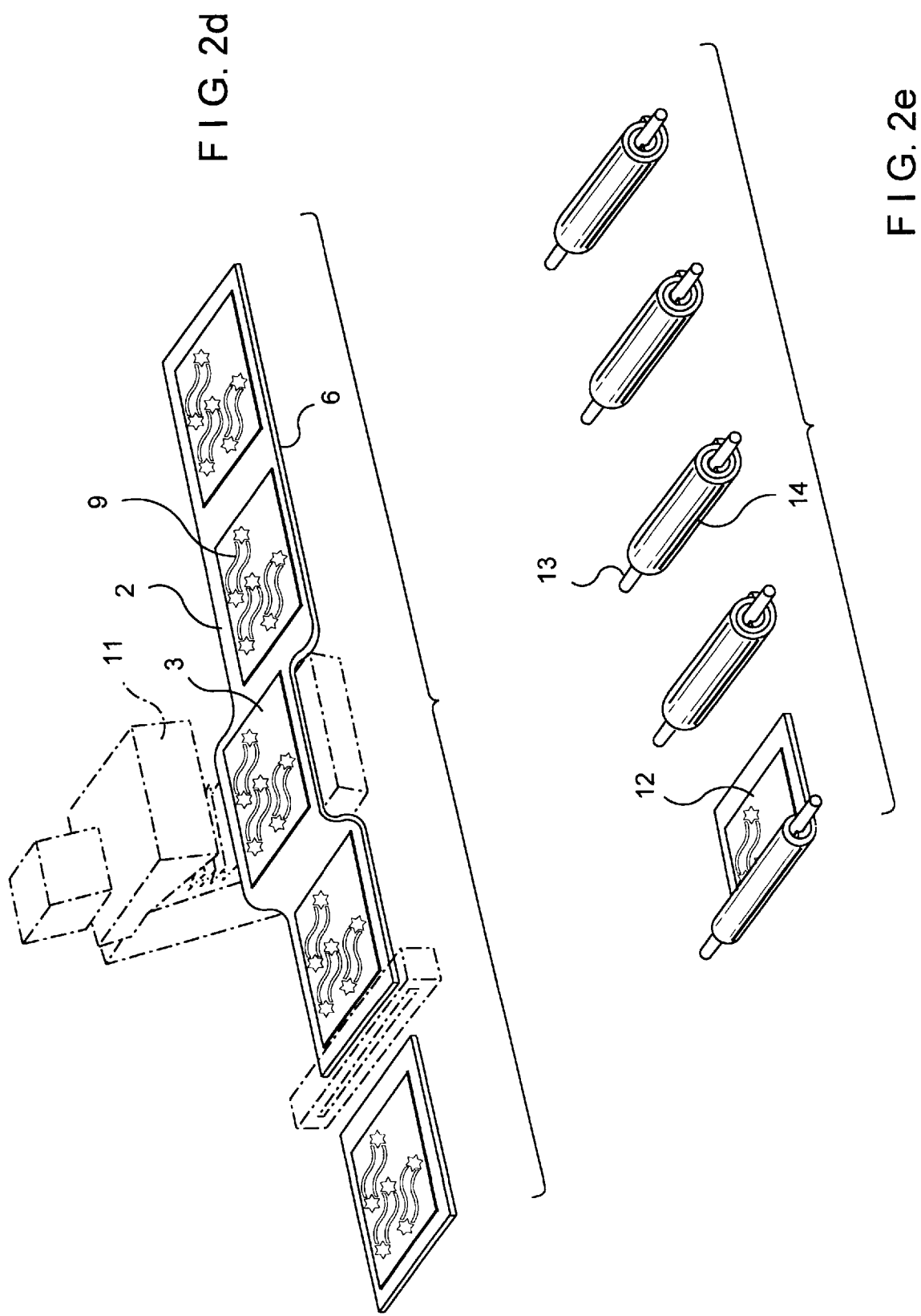

ORNAMENTAL DEVICE FOR HOOD OF A CAR

This is a continuation in part of U.S. patent application Ser. No. 08/872,947 filed on Jun. 11, 1997 which now abandoned, for which priority is claimed under 35 U.S.C. 120.

BACKGROUND OF THE INVENTION

1. Field of the Invention

The present invention relates to an ornamental device used to decorate the hood of a car, a method of applying an ornamental design for a hood and the combination of ornamental design and a hood of an automobile. In particular, the present invention relates to an ornamental device having a surface which is magnetically attached to the hood of a car and which can be formed of any one of a vast variety of designs and shapes for forming an aesthetically pleasing decorative hood ornament for an automobile.

2. The Prior Art

The attachment of signs or display devices to vehicles using magnetic means is well known in the art, see U.S. Pat. Nos. 2,960,786, 3,826,026, 3,372,503, 3,670,438, and 4,028,827.

However, none of these patents disclose an ornamental device used to decorate the hood of a car. Additionally, these patents only disclose devices in which magnets or magnetic strips are mounted to the signs for attachment to the surface of a car. These patents do not disclose devices in which the surface of the device itself is magnetic.

This is an important distinction between these prior art patents and the present invention because in the present invention there is a closeness of the ornamental device to the surface of the car. This closeness allows for greater attraction of the hood ornament to the surface of the automobile, and increased weather resistance. Second, the closeness of the hood ornament to the surface of the hood is more aesthetically pleasing because the ornament looks as though it is part of the car.

U.S. Pat. Nos. 4,310.978, 4,663,874 and 4,310,978 disclose magnetic signs. These patents, however, do not disclose an ornamental device for decorating the hood of a car. These devices are for advertising or safety purposes.

BRIEF DESCRIPTION OF THE DRAWINGS

FIG. 1 is a fragmentary view of the decorative hood ornament.

FIGS. 2a, 2b, and 2c show the invention being assembled in successive stages in which:

FIG. 2a is an exploded view of the second layer of the decorative hood ornament;

FIG. 2b is a perspective view of the first and second layer of the decorative hood ornament attached to one another;

FIG. 2c is a perspective view of the first and second layer of the decorative hood ornament with a design on the first layer;

FIG. 2d illustrates one embodiment of cutting out the design pattern on the first layer by a machine;

FIG. 2e illustrates how the completed decorative hood ornament is rolled up for packaging and shipping.

SUMMARY OF THE INVENTION

Figure 2A:
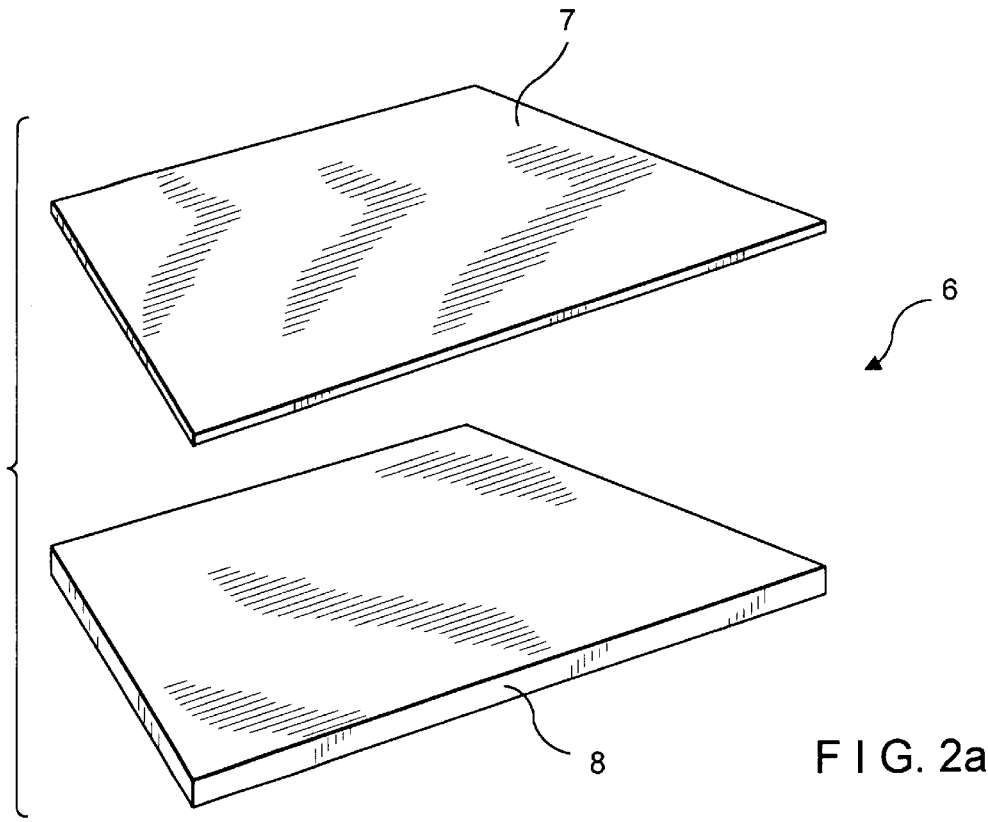

Accordingly, it is a principle object of the present invention to provide an incorporated decorative ornament for a hood of an automobile.

It is yet another object of the invention to allow heat to escape through pinholes in the decorative ornament, which expands due to the heat rising from the hood of the automobile, which comes from the engine of the automobile when the automobile is running.

It is still another object of the present invention to provide a weather resistant ornament for the hood of a car that can resist rain, wind, snow and other environmental conditions.

It is a further object of the present invention is to provide an ornament for a hood of a car in which a limitless number of designs may be used.

It is still another object of the present invention to provide in combination a decorative hood ornament formed as a mat and a hood of an automobile for decorating the hood of an automobile.

It is yet another object of the invention to provide a decorative hood ornament for a car which is magnetically attached to the hood of a car and which is solely for aesthetic purposes instead of advertising purposes.

It is another object of the invention to provide a method for decorating a hood of a car.

Yet another object of the present invention is to have an ornament for a hood of a car that can be a limitless number of different shapes.

It is still another object of the inventor to provide an ornamental design product exclusively for the hoods of automobiles which will replace pinstripping and car paintings by making designs, symbols, statements, pictures and artistic expressions which are applied to a magnetic mat, exclusively for a hood of a car, and is not permanent and can be used any time, on any car, and can be used multiple times for many years.

It is yet another object of the invention to provide pin sized holes in the decorative ornament to permit the painted surfaces to breathe, and to allow heat to escape through the pinholes rising from the hood of the car due to the heat of the engine of the car when the car is running.

Still another object of the present invention is to have a decorative ornament for the hood of a car, which can be removed without damaging the paint on the hood or the hood itself.

Briefly, the present invention comprises a weather resistant first layer with a top and a bottom surface. The top surface of the first layer having a desired design placed thereon. Additionally, the present invention further comprises a second layer having an upper and a lower surface. The upper surface of the second layer is firmly attached to the bottom surface of the first layer, preferably by the use of an adhesive.

Further, the lower surface of the second layer magnetically mounts firmly flat on top of the hood of the car to decorate the hood. Additionally, the first and second layer when attached are easily cut to any shape desired for the decorative ornament.

Symbols, statements, pictures and artistic expressions can be applied to a magnetic mat, exclusively for the hood of an automobile. It is not permanently applied to the hood of an automobile and can be used anytime, on any automobile and can be used multiple times for many years.

DETAILED DESCRIPTION OF THE PREFERRED EMBODIMENTS OF THE INVENTION

Referring to the drawings of FIGS. 1–2(e), and in particular, FIG. 1 shows a decorative ornament, a mat (1) for a hood of a car comprising a weather resistant first layer (2), preferably made of white vinyl and about 1/32 of an inch thick, having a top surface (3) and a bottom surface (4). A design is placed, preferably by an ink or printing method, on the top surface (2) of the first weather resistant layer (5). The decorative ornament (1) of the hood of a car further comprises a second layer (6), preferably flexible and made of black rubber. The second layer (6) is preferably 1/32 of an inch thick. The completed mat is approximately and preferably 1/32 of an inch thick to provide a skin-like layer to a hood of an automobile.

The second layer (6) includes an upper surface (7) and a lower surface (8). The lower surface (8) of the second layer having magnetic means or made of magnetic material. It preferably contains magnetic filings placed within the rubber interior. It is preferred that the lower surface (8) is comprised of magnetized material with a very strong holding power for metallic surfaces.

The lower surface (8) of the second layer (6) magnetically mounts firmly flat on top of a hood of a car for decorating the car. The upper surface (7) of the second layer is firmly attached to the bottom surface (4) of the first layer (2), preferably by very strong acrylic adhesive in order to provide excellent weather resistance.

It is preferable to place pin size holes into the rubber mat (1). Pin holes are preferably provided through the mat or ornament (1) and are evenly spaced so that there are two pin holes for every three square inches of the mat (1). Preferably there would be 208 pinholes distributed throughout a mat (1) with the preferred dimensions of 24 inches by 39 inches. The pin holes are placed evenly throughout the mat. These holes are placed primarily to perform many important functions for the mat (1) to work effectively with its exclusive incorporated partner—the hood of the car.

First, all car hoods are painted and the mat (1) is placed directly on the painted surface. The pin holes allow the covered, painted surface to breathe since all paints constantly release gases into the air, the paint cannot naturally release these fumes into the air without the expanding pinholes and will begin to decay and flake.

Second, when the mat (1) is on the hood and the car is in use, there will be a heat transfer with the engine heat being transferred from the engine to the air under the hood, and from the air to the hood itself. As the heat rises the magnetism in the mat (1) slowly decreases due to the increase in thermal energy being transferred to the mat(l) from the hood. The rubber mat (1) will expand due to the heat transfer and as the mat expands the pinholes will increase in size as well, allowing the heat to escape from the mat and keeping the heat between the mat (1) and the hood at a constant. This allows the magnetism in the mat (1) to maintain its maximum strength, permits the paint on the hood that is covered to maintain a constant temperature thereby preventing paint damage, and it allows the temperature between the hood and the mat to stay at a temperature which will allow the incorporation of the mat (10 and the hood to work at its best.

Referring now to FIGS. 2(a)–2(e). FIGS. 2(a)–2(e) show an enlarged perspective view of the top surface (3) of the weather resistant first layer (2). The weather resistant first layer (2) is preferably white vinyl.

Figure 2B:
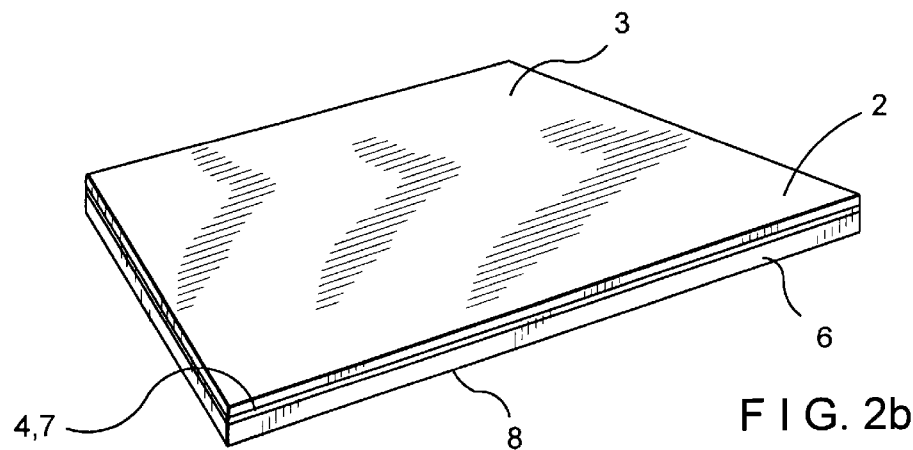
Figure 2C:
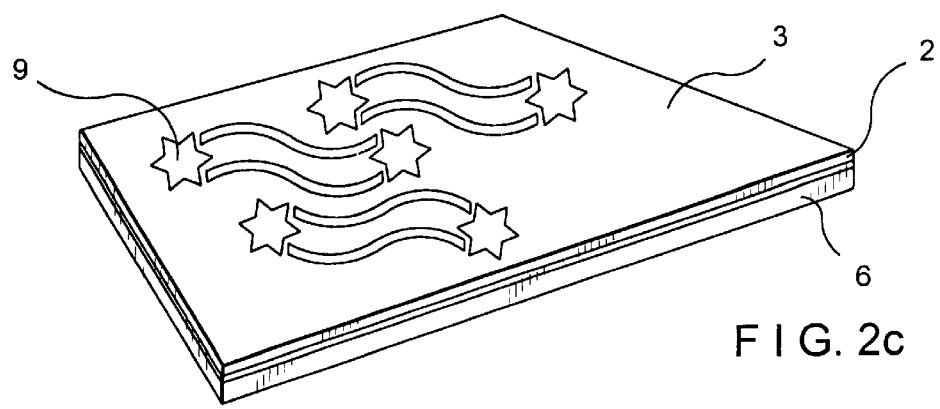

FIG. 2(a) is an exploded view of the second layer (6) of the present invention. The second layer (6) is composed of magnetized material with a strong holding power for metallic surfaces. It is preferred that the second layer(6) be flexible black rubber.

In FIGS. 2(b)–2(e) the process for making the present invention is illustrated. First, referring to FIG. 2(b), the bottom surface (4) of the first layer (2) is paper thin and is adhesively bonded to the upper surface (7) of the second layer 1/32" (6). The second layer may be formed of vinyl layer of preferably 1/50" thick or a painted coating also no thicker than 1/50". The vinyl layer is adhesively connected to the first layer by adhesive only such as glue of no more than 1/50" in thickness. The first layer is not thicker than 1/32" so that the total completed mat is no more than 1/16" thick. Second, referring to FIG. 2(c), an ink or photographic design pattern (9) is then placed, preferably by an ink or printing method, onto the top surface (3) of the first layer (2) by a machine (10). The design pattern(9) can be printed on the first layer(2) using many different printing methods which include lamination, stamps, thermographics, and micro-imaging. Additionally,the design pattern(9) may also be inked on using a number of different inking methods including vinyl ink, hand letter ink, thermographics, and enamel. Companies such as Graphics Converting located at 6701 West Oak Town, Niles, Ill. 60174, (847)967-3300 or Plastic Printing located at 2023 West Carroll Avenue, Chicago, Ill. 60612, (312)421-7880 can provide such services.

The thickness of the product, the mat(l), is preferably 1/16 of an inch thick. The thickness of the mat (1) is angled off to 1/24 of an inch on all four of its sides at a half inch before each of the four edges of the mat (1). This is done to decrease drag on the mat (1) as the air moving over the hood when the car is in motion. This increases air pressure against the mat (1) and thus increases the firm holding of the mat (1) against the hood due to this aerodynamic configuration of tapering off the thickness of the mat (1) at its edges.

The mat (1) will be used for sport figures and teams, movie actor and actresses and favorite movies and scenes, music artist, groups and duos, national pride and designs, ethnic pride and designs, flags and symbols, artwork abstract and contemporary and otherwise, and pictures personal and professional. The mat (1) will be designed with vinyl paint, illuminated paints, reflective paints and photographic pictures and thermographic processes where the design slightly lifts above the surface of the magnetic mat.

The first layer (2) adhesively bonded to the second layer (6) is readily available in rolls and the above methods may be used to place desired design patterns on these rolls. These rolls may be purchased from Adams Magnetic Products: 281 North 15th Avenue, Melrose Park, Ill. 60160.

Next, referring to FIG. 2(d), the first layer (2) and second layer (6) adhesively bonded together with a design pattern (9) located on the top surface (3) of the first layer (2) is now placed into a machine (11) in which the machine (11) has the same design pattern as is on the top surface (3) of the first layer (2) and which cuts out this design pattern (9) out from the first layer (2) through the second layer (6). Alternatively the design pattern can be cut manually or by other means for the preferred shape of the design.

In FIG. 2(e), the cut-out design (12) is now rolled on a cardboard tube (13), and the finished product(14) is packaged for stores. The finished product(14) is preferably wrapped in a transparent bag with a sticker on the bag with the sticker displaying the design of the product for identification purposes to a potential customer.

Figure 3:
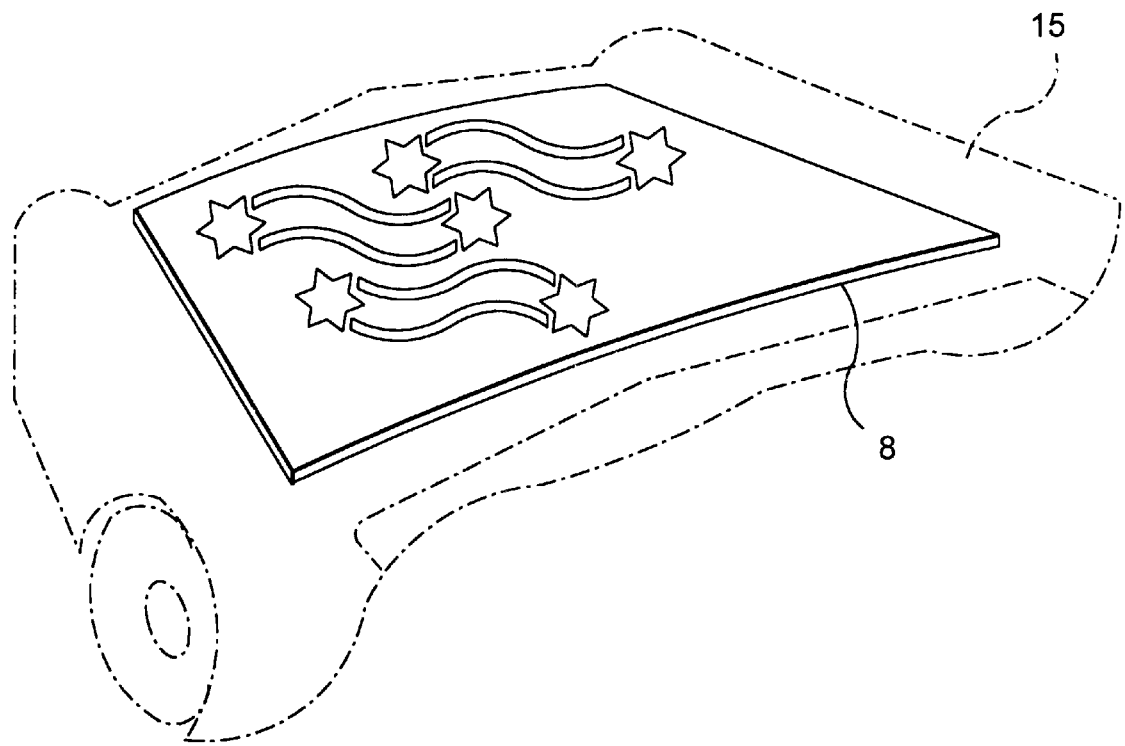
FIG. 3 is a perspective view of the present invention mounted on top of the hood of a car.

As shown in FIG. 3, the decorative ornament (1) is mounted firmly flat on top of a hood (15) of a car for decorating the hood (15) of the car. The lower surface (8) of the second layer (6) composed of magnetic material attaches firmly flat to the hood (15).

In conclusion, the present invention provides a novel decorative ornament for the hood of a car which is firmly attached magnetically to the hood of a car without damaging the car and is also weather resistant.

The reason the present invention is for cars only is that other vehicles, Ctvs trailers and all commercial trucks cannot be used or incorporated with this product due to the fact that none of these vehicles have a horizontal hood surface large enough for this product, which is in plain sight, and in eye view. The top of these vehicles have a large surface but they are not in eye view. The sides of these vehicles also have a large surface, but the weight of the product, due to its size accompanied with the motion of a moving vehicle, will exceed the magnetic strength in the mat. Since the surface is vertical the product will slide and fall off. Some of these vehicles are also made of aluminum sheeting, which does not hold magnetic properties, which will not work with the product. This is why these vehicles are using aluminum placards that are bolted to the surface of trucks. The purpose, structure and functions are completely different.

It is to be understood that the above description is only a preferred embodiment of the present invention and not meant to limit the present invention's scope.

What is claimed is:

1. In combination a weather-proof, removable, replaceable, horizontally attaching decorative ornament and a hood of a car, comprising:

a first flexible layer having a surface on which a permanent, weather-proof design is placed;

a second layer having adhesive means for bonding said first layer to said second layer and having magnetic means for bonding said second layer to a hood of a car wherein said second layer is formed of a flexible, thin rubber material and provides means for magnetically horizontally mounting said ornament as a thin skin layer to magnetically bond and conform to the shape of a top of the hood of said car for decorating said hood of said car so that even when said car is in motion said ornament stays magnetically bonded in place and wherein said first layer has a top surface and a bottom surface and said second layer has an upper surface and a lower surface and said top surface of said first layer is adapted to have a design placed therein and said bottom surface is bonded to said upper surface of said second layer;

said decoration ornament having pinholes placed through said ornament so that said second layer and said pinholes expand when said ornament is on said hood and said hood is subjected to heat permitting heat to be transferred to outside air through said pinholes thereby preventing said second layer from being heated and thus maintaining said second layer's magnetic strength so that said decorative ornament stays magnetically bonded to said hood of said car.

2. In combination said decorative ornament and said hood of a car according to claim 1 further comprising:

said decoration ornament having pinholes placed throughout said ornament so that when said ornament is on said hood and when the car is in use heat is transferred from said car's engine to outside air through said pinholes when said ornament expands due to heat transfer.

3. In combination said decorative ornament and said hood of said car according to claim 2 further comprising:

said ornament having four sides and a thickness of $\frac{1}{16}^{th}$ of an inch on said all four sides and a half inch before an edge of a surface of the second layer of said ornament having an angle of reduction in thickness beginning at said half inch from said edge of said second layer and reducing to a thickness of $\frac{1}{24}^{th}$ of an inch at said edge on all said four sides of said ornament in order to decrease drag on said ornament due to air over said hood while said car is in motion.

4. The combination according to claim 1 wherein said first layer and said second layer of said decorative ornament are bonded together and cut in to a shape.

5. The combination according to claim 1 wherein said first layer and said second layer of said decorative ornament are bonded together by adhesive means.

6. The combination according to claim 1 wherein said second layer is comprised of rubber.

7. The combination according to claim 1 wherein said first layer is comprised of vinyl.

8. The combination according to claim 1 wherein said decorative ornament is $\frac{1}{16}$ of an inch thick.

9. The combination according to claim 1 wherein said first layer when attached to the second layer is cut to a shape desired for the decorative ornament.

10. The combination according to claim 1 wherein the design on the first layer is printed on using lamination.

11. The combination according to claim 1 wherein the design on the first layer is printed on using stamps.

12. The combination according to claim 1 wherein the design on the first layer is printed on using thermographics.

13. The combination according to claim 1 wherein the design on the first layer is printed on using microimaging.

14. The combination according to claim 1 wherein the design on the first layer is inked on using vinyl ink.

15. The combination according to claim 1 wherein the design on the first layer is inked on using hand letter.

16. The combination according to claim 1 wherein the design on the first layer is inked on using enamel.

17. The combination according to claim 1 wherein the first layer is weather resistant.

18. The combination according to claim 1 wherein said decoration ornament includes one of symbols, statements, designs, pictures flags, designs of ethnic pride and nationality, personal pictures or professional pictures.

* * * * *